United States Patent
Rauh (10) Patent No.: US 10,921,157 B2
(45) Date of Patent: Feb. 16, 2021

(54) INDUCTIVE ANGULAR POSITION SENSOR

(71) Applicant: Schaeffler Technologies AG & Co. KG, Herzogenaurach (DE)

(72) Inventor: Kevin Rauh, Stow, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 199 days.

(21) Appl. No.: 16/273,829

(22) Filed: Feb. 12, 2019

(65) Prior Publication Data

US 2020/0256705 A1 Aug. 13, 2020

(51) Int. Cl.
*G01B 7/00* (2006.01)
*G01D 5/20* (2006.01)

(52) U.S. Cl.
CPC ........... *G01D 5/2046* (2013.01); *G01B 7/003* (2013.01)

(58) Field of Classification Search
CPC .... G01D 5/2241; G01D 5/2033; G01D 5/145; G01D 5/142; B60W 2420/506; G06K 7/082; H05K 2201/086; Y10S 505/87; Y10S 336/00
See application file for complete search history.

(56) References Cited

U.S. PATENT DOCUMENTS

| | | | |
|---|---|---|---|
| 5,300,882 A | 4/1994 | Barros | |
| 7,538,544 B2 | 5/2009 | Lee | |
| 7,911,354 B2 | 3/2011 | Kim | |
| 2009/0079422 A1* | 3/2009 | Lee | G01B 7/30 324/207.16 |
| 2014/0111191 A1* | 4/2014 | Andre | G01P 3/487 324/207.2 |
| 2018/0274948 A1* | 9/2018 | Maniouloux | G01P 3/49 |

FOREIGN PATENT DOCUMENTS

CN 101939615 B 7/2012

* cited by examiner

*Primary Examiner* — Tung X Nguyen
(74) *Attorney, Agent, or Firm* — Volpe Koenig (57) ABSTRACT

In one embodiment, a position sensor assembly is disclosed. The position sensor assembly includes a first bearing ring defining a first bearing raceway, and a second bearing ring defining a second bearing raceway. A ferromagnetic component is arranged on the first bearing ring. The ferromagnetic component defines a surface that has a non-uniform circumferential profile that varies for at least 90 degrees in a circumferential direction. An inductor assembly is arranged on the second bearing ring, and the inductor assembly includes at least two inductors that are circumferentially spaced from each other by at least 90 degrees.

18 Claims, 9 Drawing Sheets

INDUCTIVE ANGULAR POSITION SENSOR

FIELD OF INVENTION

The present invention relates to a position sensor, and more specifically relates to an inductive angular position sensor.

BACKGROUND

Position sensors are known in a variety of fields. Position sensors can be based on number of principles of operation, such as magnetic and hall effect sensors. However, known magnetic sensor arrangements can cause magnetic drag, which is undesirable. Other known position sensors require an external power source to maintain position information regarding the relative angular position of bearing components.

Known examples of position sensors are disclosed in U.S. Pat. Nos. 7,538,544 & 5,300,882; and CN Patent 101939615 (U.S. Pat. No. 7,911,354). Each of these arrangements suffers from deficiencies because the arrangements require relatively large coil assemblies or are not suitable for easily adapting for installation with a bearing assembly. These known arrangements also require a transmitter and antennae coil to provide a transmitter arrangement.

It would be desirable to provide an inductive position sensor arrangement that does not require external power and can reliably detect the position of a bearing component.

SUMMARY

In one embodiment, a position sensor assembly is disclosed. The position sensor assembly includes a first bearing ring defining a first bearing raceway, and a second bearing ring defining a second bearing raceway. A ferromagnetic component is arranged on the first bearing ring. The ferromagnetic component defines a surface that has a non-uniform circumferential profile that varies for at least 90 degrees in a circumferential direction. An inductor assembly is arranged on the second bearing ring, and the inductor assembly includes at least two inductors that are circumferentially spaced from each other by at least 90 degrees.

In one embodiment, the inductor assembly and the surface of the ferromagnetic component overlap with each other in an axial direction.

The surface of the ferromagnetic component can be defined directly on an axial end face of the first bearing ring.

In one embodiment, the surface of the ferromagnetic component is defined on an annular base ring that is separately formed from the first bearing ring. The first bearing ring includes an axially extending flange, and the annular base ring is press-fit onto the axially extending flange to fix the annular ring to the first bearing ring.

In one embodiment, the surface of the ferromagnetic component has an axial height that varies for at least 180 degrees.

In one embodiment, the annular ring of the inductor assembly includes at least one radially extending fastening flange, and the second bearing ring includes at least one receptacle adapted to receive the at least one radially extending fastening flange to secure the inductor assembly to the second bearing ring.

The inductors consist of coils or wires, and the coils or the wires each have a constant thickness and identical profile relative to each other. The inductors are circumferentially offset from each other by 180 degrees. In one embodiment, the inductors are circumferentially offset from other by 360 degrees divided by the number of ramps formed on the ferromagnetic component.

An axial height of the surface of the ferromagnetic component increases between 0 degrees to 180 degrees, and the axial height decreases between 180 degrees to 360 degrees to provide full rotational measurements. An axial height of the surface of the ferromagnetic component has a circumferential extent of 120 degrees, for providing the ability to measure rotation up to and including 90 degrees. The surface of the ferromagnetic component defines a ramp, and the ramp has a varying thickness.

Other variations of the position sensor assembly are disclosed in more detail herein.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft or circular opening. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Figure 1A:
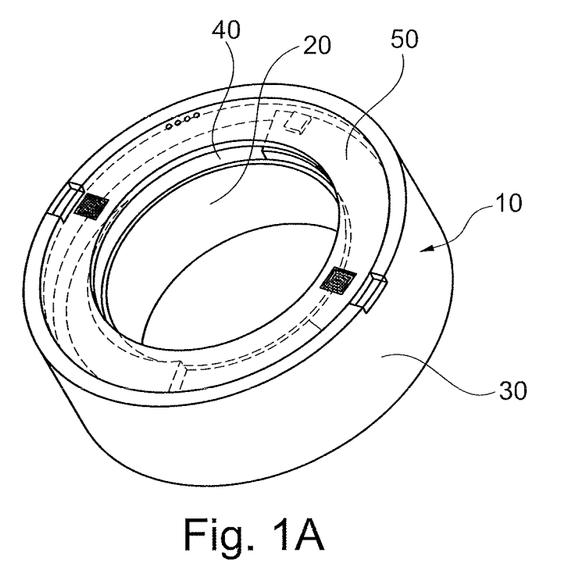
FIG. 1A is a perspective view of a position sensor assembly according to an embodiment.
Figure 1B:
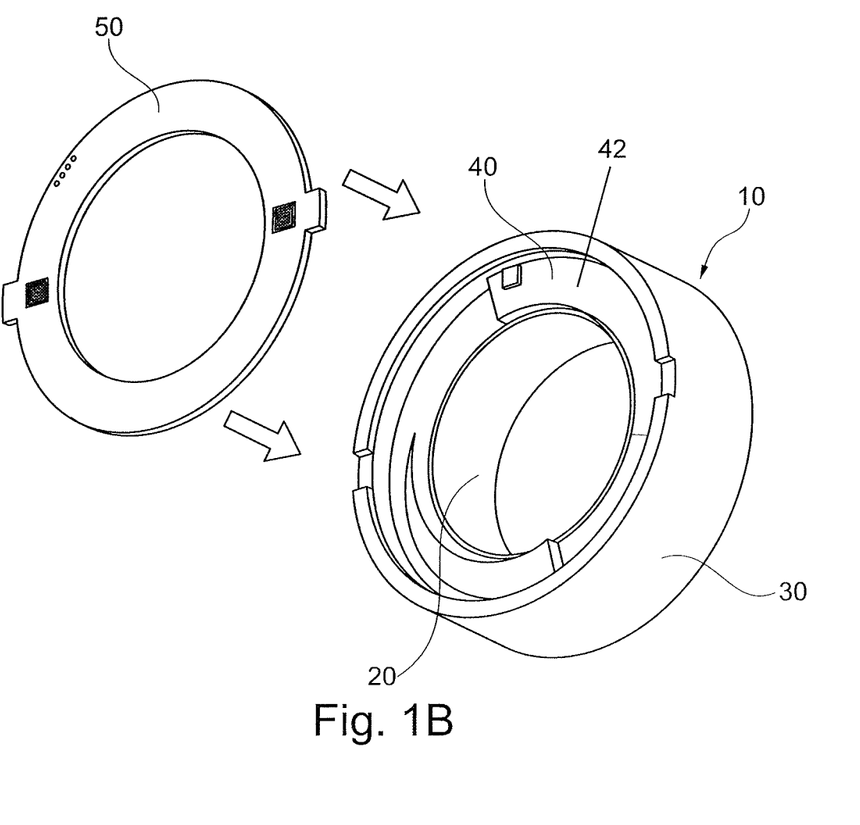
FIG. 1B is a perspective view of the position sensor assembly according to FIG. 1A with an inductor assembly removed.

A position sensor assembly 10 is shown in FIGS. 1A and 1B. The position sensor assembly 10 includes a first bearing ring 20 defining a first bearing raceway 22, and a second bearing ring 30 defining a second bearing raceway 32. The bearing rings 20, 30 and raceways 22, 32 can be configured to support any variety of rolling elements.

A ferromagnetic component 40 is arranged on the first bearing ring 20. In one embodiment, the ferromagnetic component 40 is formed as an annular ring. The ferromagnetic component 40 defines a surface 42 that has a non-uniform circumferential profile. As used herein, the term non-uniform with respect to the circumferential profile of the surface 42 means the surface 42 has at least one variation around a 360 degree surface of the ferromagnetic component 40. In other words, the circumferential profile of the surface 42 is non-constant.

An inductor assembly 50 is arranged on the second bearing ring 30. FIG. 1A shows the inductor assembly 50 in the installed state while FIG. 1B shows the inductor assembly 50 prior to installation. The inductor assembly 50 and the surface 42 of the ferromagnetic component 40 overlap with each other in an axial direction. The axial direction, circumferential direction, radial direction, etc. are defined relative to a rotational axis (X) of the assembly 10. The inductor assembly 50 and the surface 42 of the ferromagnetic component 40 directly face each other and no additional components are positioned between these components.

Although the ferromagnetic component 40 is illustrated as being connected to directly formed on the first bearing ring 20, i.e. the inner bearing ring, one of ordinary skill in the art would understand that the ferromagnetic component 40 could be connected to or formed on the second bearing ring 30, i.e. the outer bearing ring, and the inductor assembly 50 can be provided on the first bearing ring 20.

Figure 2A:
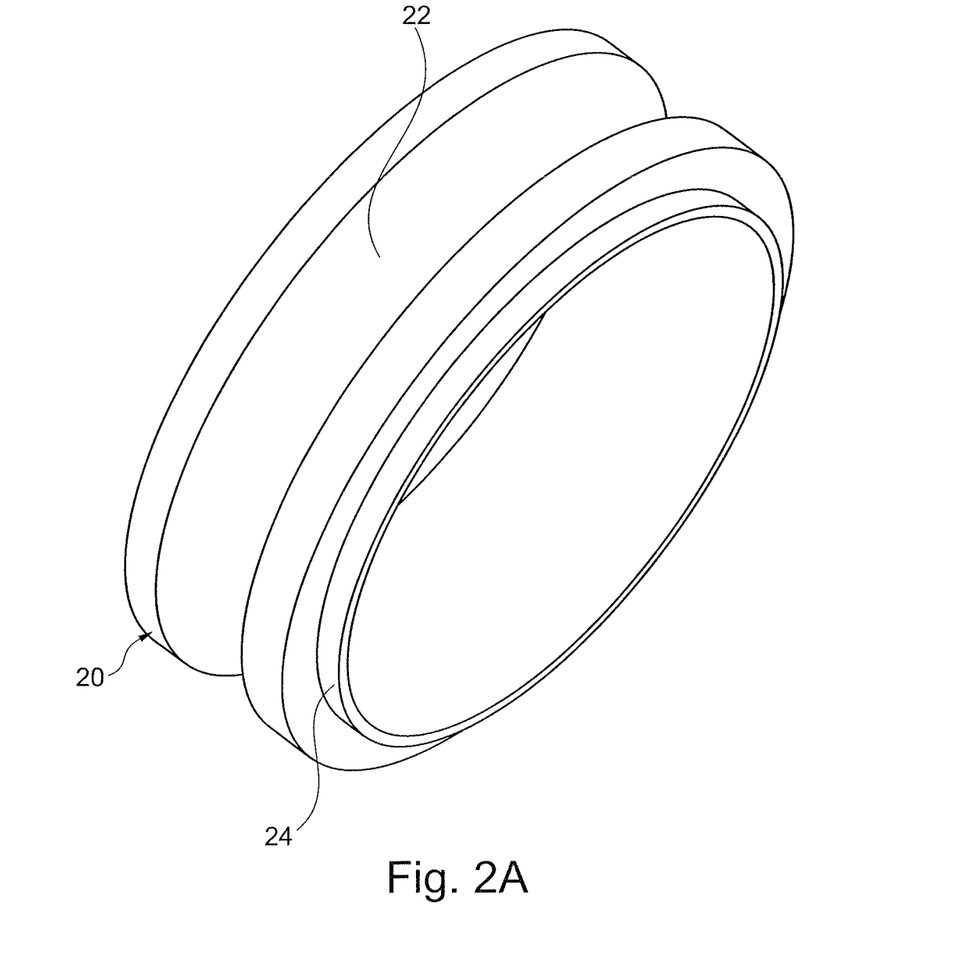
FIG. 2A is a perspective view of an inner bearing ring according to one embodiment.

In one embodiment, the surface 42 of the ferromagnetic component 40 is defined on an annular base ring 44 that is separately formed from the first bearing ring 20. As shown in FIG. 2A, the first bearing ring 20 can include an axially extending flange 24. The annular base ring 44 is press-fit onto the axially extending flange 24 to fix the annular base ring 44 of the ferromagnetic component 40 to the first bearing ring 20. Other known arrangements can be provided to attach the separately formed annular base ring 44 to the first bearing ring 20.

Figure 2B:
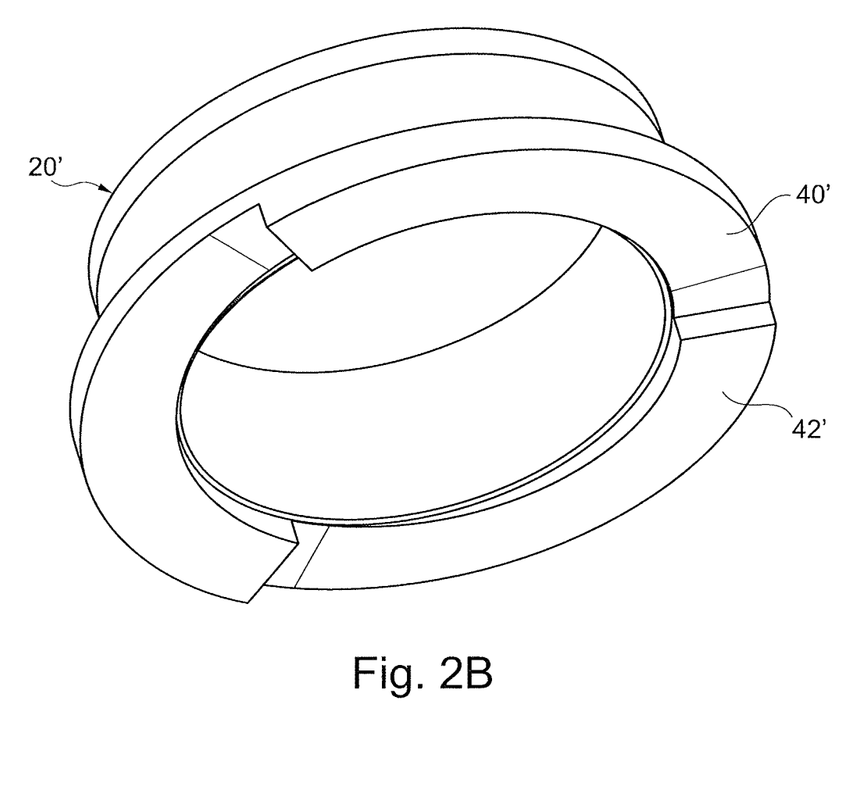
FIG. 2B is a perspective view of an inner bearing ring with an integrally formed ferromagnetic component.

In one embodiment shown in FIG. 2B, the surface 42' of the ferromagnetic component 40' is formed directly on an axial end face of the first bearing ring 20'.

Figure 3A:
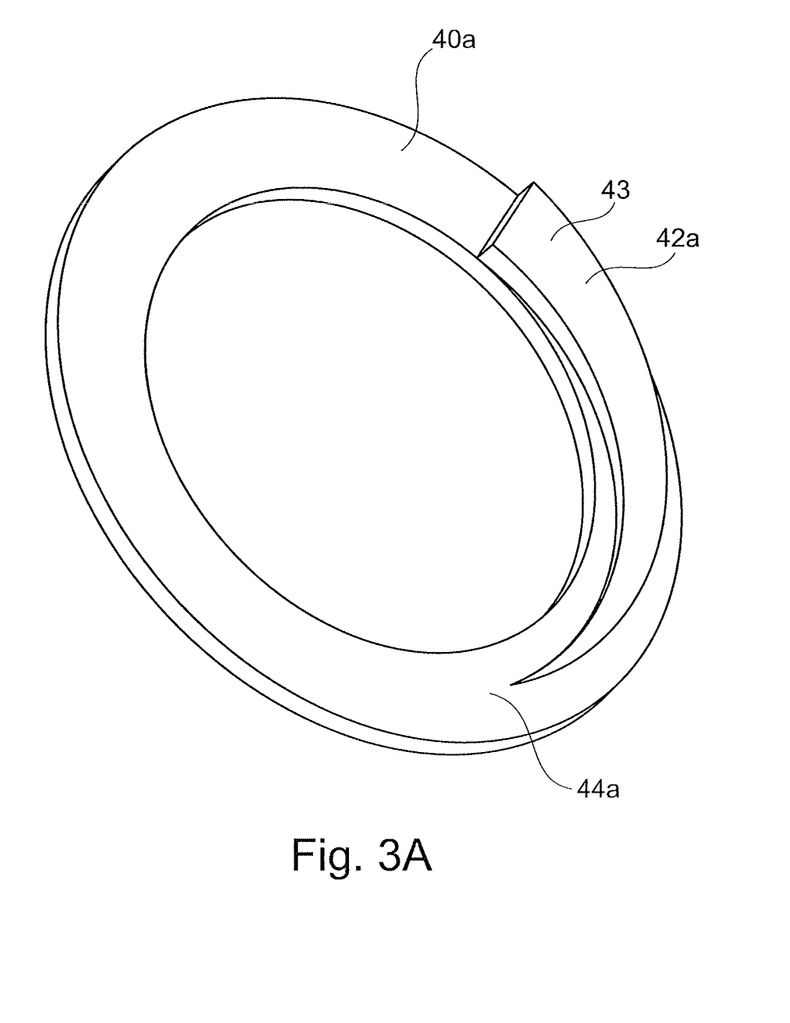
FIG. 3A is a perspective view of a first embodiment of a ferromagnetic component.

In one embodiment shown in FIG. 3A, the surface 42a of the ferromagnetic component 40c defines a ramp 43, and the ramp 43 has a varying thickness that tapers to a larger thickness as an axial height of the ramp 43 increases.

Figure 3B:
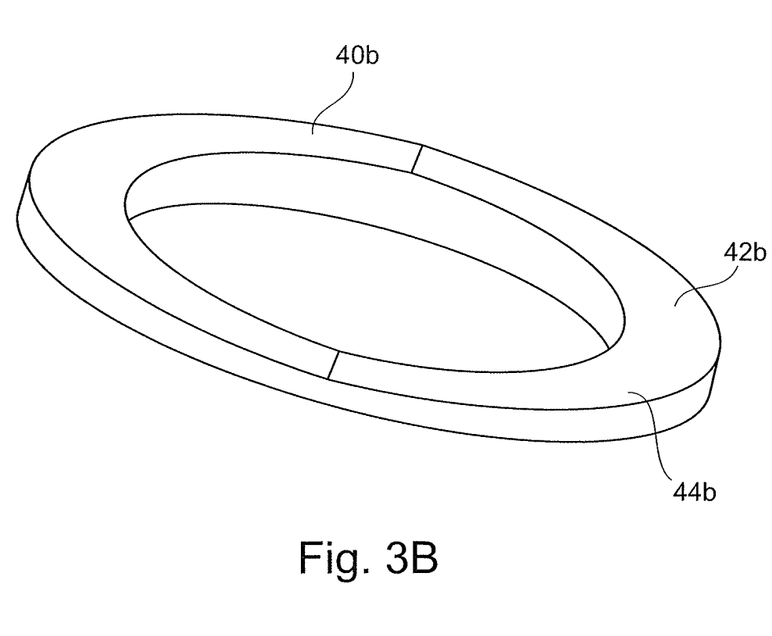
FIG. 3B is a perspective view of a second embodiment of a ferromagnetic component

As shown in FIG. 3B, in one embodiment, the surface 42b of the ferromagnetic component 40b has an axial height that varies for at least 180 degrees. As shown in FIG. 3B, an axial height of the surface 42b of the ferromagnetic component 40b increases between 0 degrees to 180 degrees, and the axial height decreases between 180 degrees to 360 degrees.

Figure 3C:
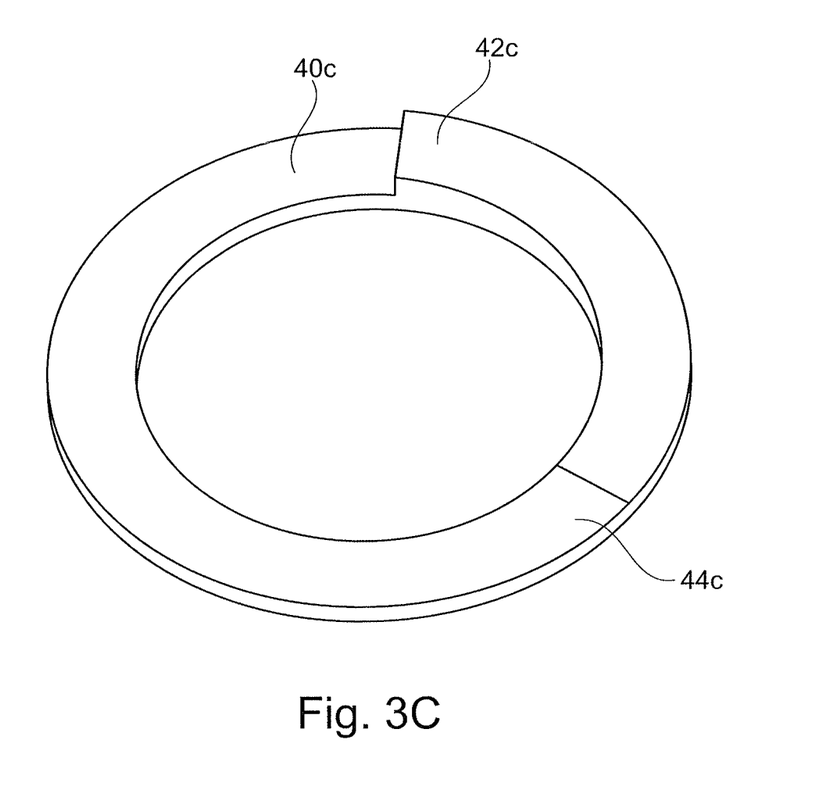
FIG. 3C is a perspective view of a third embodiment of a ferromagnetic component.

As shown in FIG. 3C, in one embodiment, an axial height of the surface 42c of the ferromagnetic component 40c has a profile that varies for a circumferential extent of 120 degrees.

Figure 4:
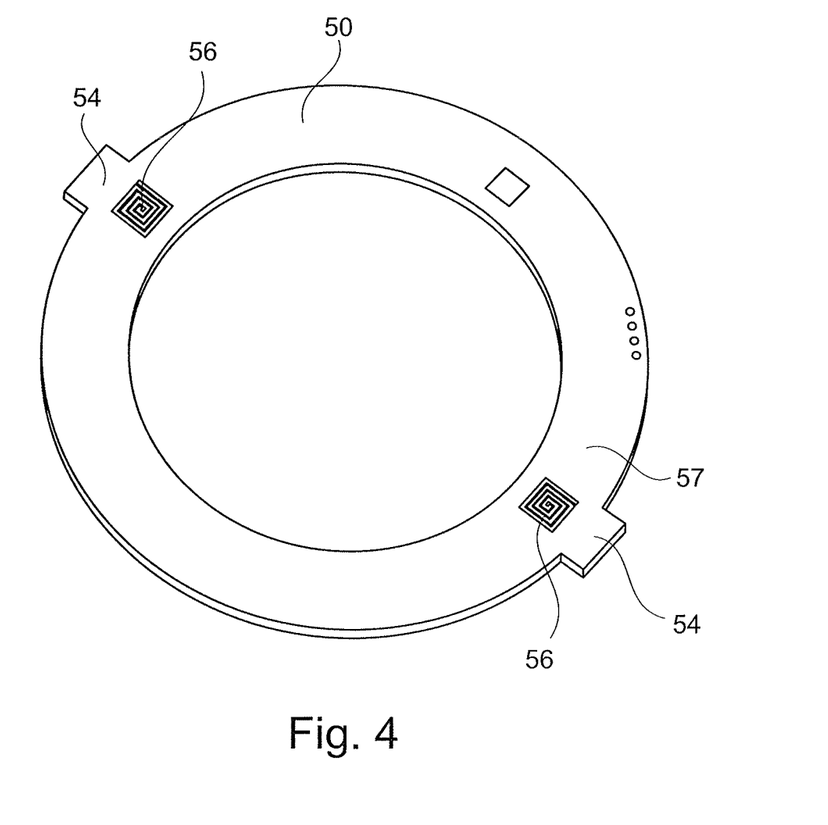
FIG. 4 is a perspective view of an inductor assembly.
Figure 5:
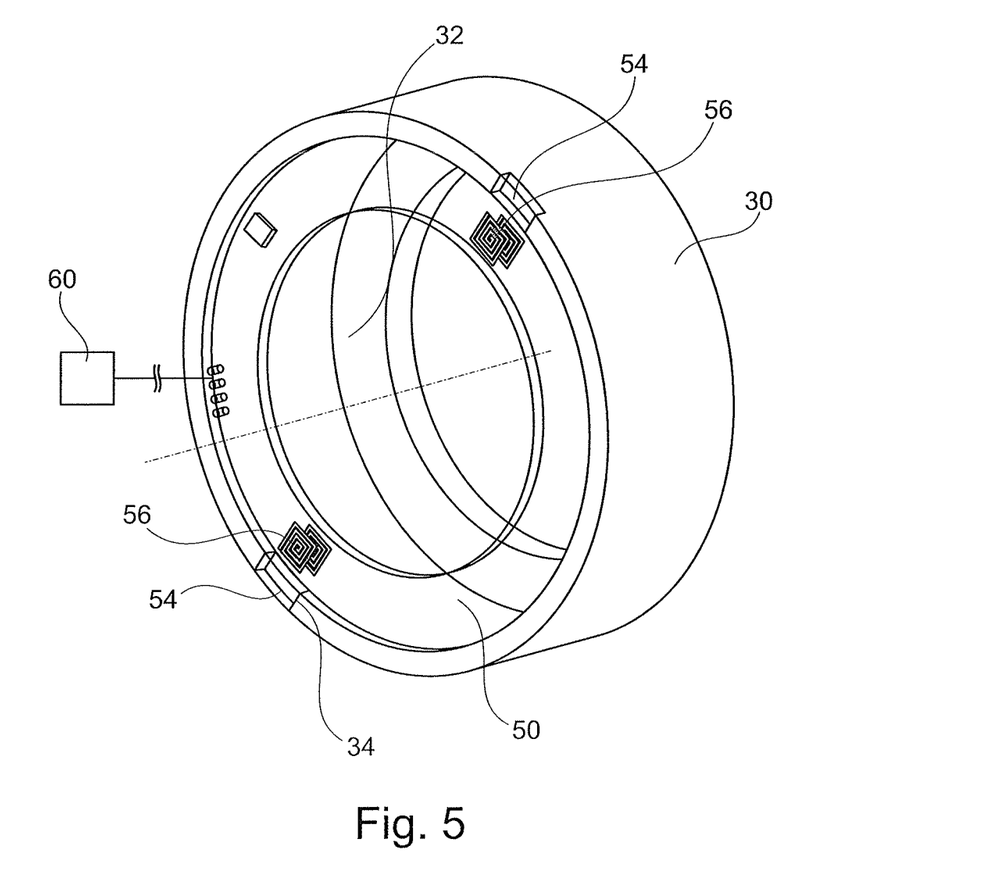
FIG. 5 is a perspective view of the inductor assembly attached to a second bearing ring.

As shown in FIG. 4, in one embodiment, the inductor assembly 50 is formed as an annular ring 52 and includes a printed circuit board (PCB). As shown in FIG. 5, the annular ring 52 of the inductor assembly 50 includes at least one radially extending fastening flange 54, and the second bearing ring 30 includes at least one receptacle 34 adapted to receive the at least one radially extending fastening flange 54 to secure the inductor assembly 50 to the second bearing ring 30.

In one embodiment, the inductor assembly 50 includes at least two inductors 56. In one embodiment, the inductors 56 consist of coils or wires. In one embodiment, the coils or the wires each have a constant thickness and an identical profile to each other. The two inductors 56 are distinct and separately formed from each other.

In the embodiment of FIGS. 1A, 1B, 4, and 5, the inductors 56 are circumferentially offset from each other by 180 degrees (as measured by a plane extending through a mid-point of each one of the inductors 56). One of ordinary skill in the art would understand that the configuration of the inductors 56 can be varied depending on a particular application, and more or less than two inductors 56 can be provided.

Figure 6:
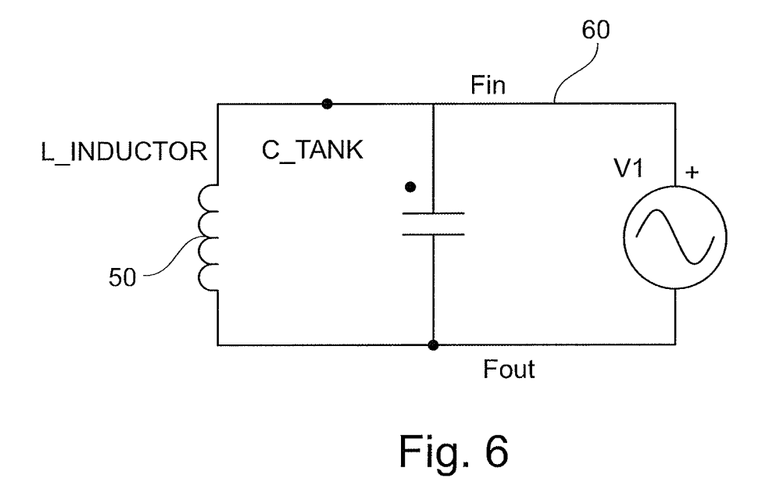
FIG. 6 is a schematic illustration of an inductor assembly with a sensor assembly.

A sensor assembly 60 is connected to the inductor assembly 50, as shown in FIG. 5 and shown schematically in FIG. 6. The sensor assembly 60 can include capacitors that are wired in parallel to the inductors 56. Based on a rotational position of the ferromagnetic component 40, the inductance of the inductor assembly 50 will vary providing a specific signal oscillation. As power is applied to the inductors 56, oscillations occur in the sensor assembly 60 or an integrated tank circuit. The frequency of oscillations is dependent on the inductance and capacitance of a circuit in the sensor assembly 60. In FIG. 6, the varying frequency matches a resonance frequency of the circuit ($F_{in}=F_{out}$). With a constant capacitance, the frequency of oscillations can be used to calculate the inductance. In one embodiment, the inductors 56 are stationary so that the angular movement is only on the first bearing ring 20 (i.e. the inner bearing ring). The sensor assembly 60 can include a central processor unit (CPU), memory, input/output interface, and other known electronic components. The components in the sensor assembly 60 can process the frequency measurement from the inductor assembly 50 and convert it to inductance values, such as henrys (H). Each angular position will have a specific value of inductance, so the absolute angular position of the bearing can be determined.

In general, the position sensing ability of the ferromagnetic component 40, the inductor assembly 50, and the sensor assembly 60 operates based on a relative position of the ferromagnetic component 40 to the inductor assembly 50. In particular, in one embodiment, as the first bearing ring 20 rotates, an axial height of the ferromagnetic component 40 increases, which decreases the air gap between the ferromagnetic component 40 and the inductor 50. As the air gap between the ferromagnetic component 40 and the inductor 50 reaches a minimum, the inductance in the inductor assembly 50 reaches a maximum value. As an angle of rotation between the first bearing ring 20 and the second bearing ring 30 changes, a height of the ramp formed on the ferromagnetic component 40 also changes and an inductance value can be measured. With various levels of inductance, the angular position of the first bearing ring 20 relative to the second bearing ring 30 can be measured and determined.

Although the embodiments illustrated in the drawings are shown as radial bearings, the position sensor assembly 10 can be adapted to be used in a variety of types of bearing assemblies.

The embodiments disclosed herein do not require a magnet or external power source to maintain current angular rotation measurements, i.e. if power is lost to the system the absolute position of the system will not be lost.

Having thus described the present invention in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

LOG OF REFERENCE NUMERALS position sensor assembly 10
first bearing ring 20
first bearing raceway 22
axially extending flange 24
second bearing ring 30
second bearing raceway 32
receptacle 34
ferromagnetic component 40
surface 42
ramp 43
annular base ring 44
inductor assembly 50
annular ring 52
radially extending fastening flange 54
inductors 56
sensor assembly 60

What is claimed is:

1. A position sensor assembly comprising:
   a first bearing ring defining a first bearing raceway, and a second bearing ring defining a second bearing raceway;
   a ferromagnetic component arranged on the first bearing ring, the ferromagnetic component defining a surface that has a non-uniform circumferential profile that varies for at least 90 degrees in a circumferential direction; and
   an inductor assembly arranged on the second bearing ring, the inductor assembly including at least two inductors that are circumferentially spaced from each other by at least 90 degrees.

2. The assembly of claim 1, wherein the inductor assembly and the surface of the ferromagnetic component overlap each other in an axial direction.

3. The assembly of claim 1, wherein the surface of the ferromagnetic component is defined directly on an axial end face of the first bearing ring.

4. The assembly of claim 1, wherein the surface of the ferromagnetic component is defined on an annular base ring that is separately formed from the first bearing ring.

5. The assembly of claim 4, wherein the first bearing ring includes an axially extending flange, and the annular base ring is press-fit onto the axially extending flange to fix the annular ring to the first bearing ring.

6. The assembly of claim 1, wherein the surface of the ferromagnetic component has an axial height that varies for at least 180 degrees.

7. The assembly of claim 1, wherein the inductor assembly is formed as an annular ring and includes a printed circuit board (PCB).

8. The assembly of claim 7, wherein the annular ring of the inductor assembly includes at least one radially extending fastening flange, and the second bearing ring includes at least one receptacle adapted to receive the at least one radially extending fastening flange to secure the inductor assembly to the second bearing ring.

9. The assembly of claim 1, wherein the at least two inductors consist of coils or wires, and the coils or wires have a constant thickness and identical profile.

10. The assembly of claim 9, wherein the at least two inductors are circumferentially offset from each other by 180 degrees.

11. The assembly of claim 1, wherein an axial height of the surface of the ferromagnetic component increases between 0 degrees to 180 degrees, and the axial height decreases between 180 degrees to 360 degrees.

12. The assembly of claim 1, wherein an axial height of the surface of the ferromagnetic component varies along a circumferential extent of 120 degrees.

13. The assembly of claim 1, wherein the surface of the ferromagnetic component defines a ramp, and the ramp has a varying thickness.

14. A position sensor assembly comprising:
   a first bearing ring defining a first bearing raceway, and a second bearing ring defining a second bearing raceway;
   a ferromagnetic component arranged on the first bearing ring, the ferromagnetic component defining a surface that has a non-uniform circumferential profile that varies for at least 90 degrees in a circumferential direction,
      the ferromagnetic component being either: (i) integrally formed with the first bearing ring; or (ii) a separately formed annular ring that is press-fit onto the first bearing ring; and
   an inductor assembly arranged on the second bearing ring,
      the inductor assembly including at least two inductors that are circumferentially spaced from each other by at least 90 degrees.

15. The assembly of claim 14, wherein the at least two inductors consist of coils or wires, and the coils or the wires have a constant thickness and identical profile.

16. The assembly of claim 14, wherein the at least two inductors are circumferentially offset from each other by 180 degrees.

17. The assembly of claim 14, wherein the inductor assembly is formed as an annular ring and includes a printed circuit board (PCB),
   the annular ring of the inductor assembly includes at least one radially extending fastening flange, and
   the second bearing ring includes at least one receptacle adapted to receive the at least one radially extending fastening flange to secure the inductor assembly to the second bearing ring.

18. The assembly of claim 14, wherein an axial height of the surface of the ferromagnetic component increases between 0 degrees to 180 degrees, and the axial height decreases between 180 degrees to 360 degrees.

* * * * *